United States Patent [19]

Wyss

[11] E Re. 31,492

[45] Reissued * Jan. 10, 1984

[54] ELECTRICAL DISCHARGE MACHINING APPARATUS WITH SIMULTANEOUS RELATIVE ADVANCE AND CYCLIC TRANSLATIONAL MOVEMENT OF THE ELECTRODES

[75] Inventor: George Wyss, Zurich, Switzerland

[73] Assignee: Ateliers des Charmilles, S.A., Geneva, Switzerland

[ * ] Notice: The portion of the term of this patent subsequent to Aug. 1, 1995 has been disclaimed.

[21] Appl. No.: 260,306

[22] Filed: May 4, 1981

Related U.S. Patent Documents

Reissue of:

[64] Patent No.: 4,243,863
Issued: Jan. 6, 1981
Appl. No.: 921,784
Filed: Jul. 3, 1978

U.S. Applications:

[62] Division of Ser. No. 696,712, Jun. 16, 1976, Pat. No. 4,104,500, and Ser. No. 696,713, Jul. 16, 1976, Pat. No. 4,104,501.

[30] Foreign Application Priority Data

Jun. 18, 1975 [CH] Switzerland ..... 7932/75

[51] Int. Cl.[3] ..... B23P 1/12
[52] U.S. Cl. ..... 219/69 V
[58] Field of Search ..... 219/69 V, 69 M, 69 R

[56] References Cited

U.S. PATENT DOCUMENTS

| | | | |
|---|---|---|---|
| 2,773,968 | 12/1956 | Martellotti et al. | 219/69 V |
| 3,135,852 | 6/1964 | Bentley et al. | 219/69 V |
| 3,322,929 | 5/1967 | Mayer et al. | 219/69 V |
| 3,433,919 | 3/1969 | Braudeau et al. | 219/69 V |
| 3,539,754 | 11/1970 | Furze et al. | 219/69 V |
| 3,564,190 | 2/1971 | Kandajan et al. | 219/69 V |
| 3,809,852 | 5/1974 | Weber | 219/69 V |
| 4,104,500 | 8/1978 | Wyss | 219/69 V |

*Primary Examiner*—C. C. Shaw
*Attorney, Agent, or Firm*—Hauke & Patalidis

[57] ABSTRACT

In the electrical discharge machining of the surface of a recess in a workpiece electrode to a shape corresponding to that of a tool electrode, the electrodes are relatively displaced, during a finishing phase of machining, along an axis of penetration and simultaneously in a plane perpendicular to the axis of penetration with a cyclic translational movement whose amplitude increases with the penetration of the tool in the workpiece. This provides a virtual 3-dimensional dilatation of the tool as it advances, and enables control of the sparking in both the frontal and lateral parts of the machining zone, such that the shape of the machined [position] *portion* is an image of the tool shape. The cyclic translational movements can be obtained with an eccentric member whose eccentricity relative to a shaft is controlled by limiting axial movement of the shaft at a position corresponding to a predetermined penetration.

11 Claims, 6 Drawing Figures

2

3
4
44
43
5
A
18
19
17
23
22
24
13
28
26
7
14
29
40
25
27
36
8
31
32
35
15
20
16
21
33
30
12
6
9
45
6
1
2
38
37
10
11
3
39
34
42
41
11
8
2

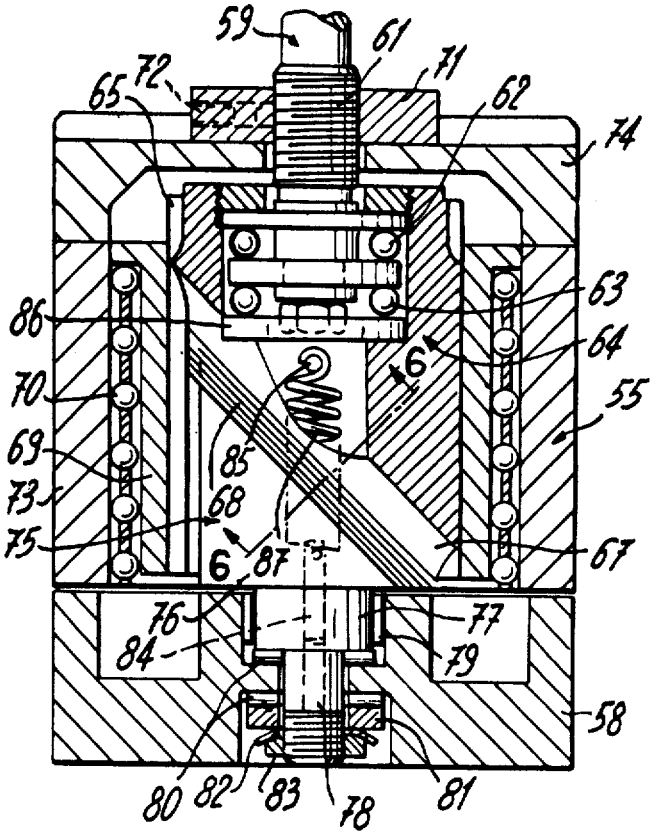
FIG. 5
FIG. 6
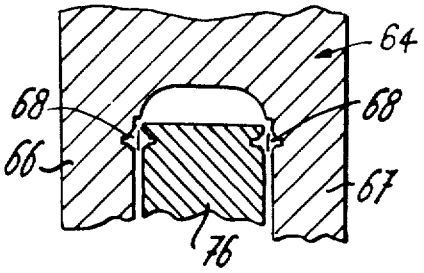

ELECTRICAL DISCHARGE MACHINING APPARATUS WITH SIMULTANEOUS RELATIVE ADVANCE AND CYCLIC TRANSLATIONAL MOVEMENT OF THE ELECTRODES

Matter enclosed in heavy brackets [ ] appears in the original patent but forms no part of this reissue specification; matter printed in italics indicates the additions made by reissue.

CROSS-REFERENCE TO RELATED APPLICATION

This application is a division of application Ser. No. 696,712, now U.S. Pat. No. 4,104,500, and application Ser. No. 696,713, now U.S. Pat. No. 4,104,501, both filed June 16, 1976 and issued Aug. 1, 1978.

BACKGROUND OF THE INVENTION

The invention [concerns] *relates to* the electrical discharge machining of the surface of a recess in a workpiece electrode by means of a tool-forming electrode. For the sake of simplification, these electrodes will hereinafter be referred to separately as "workpiece" and "tool" and jointly as "electrodes". The invention specifically [concerns] *relates to electrical discharge* machining in which the electrodes are moved relative to one another both in the direction of an axis of penetration of the tool in the workpiece and in a plane perpendicular to this axis.

It is known to machine the lateral faces of a workpiece by moving the electrodes relative to one another with a translational movement, or orbital motion, in a plane perpendicular to the axis of penetration as disclosed in U.S. Pat. No. 2,773,968, and vary the amplitude of this movement as a function of the relative displacements of the electrodes along said axis as disclosed in U.S. Pat. Nos. 3,135,852, 3,539,754 and 3,809,852, which displacements are controlled to maintain given sparking conditions in the machining zone comprised between the electrodes.

All those methods of machining result in machining [of] the lateral surfaces of the workpiece to a shape different from the shape of the tool. Another result is that the active lateral surface of the tool is displaced substantially parallel to the machined surface on the workpiece, such that there is no increase of the gap when the tool electrode is retracted. The machined shape, which is for example determined by the factor of proportionality between the amplitude of the translational movement and the axial displacement of the tool, corresponds to the shape of an envelope of the trajectories during the cyclic translational movements. A similar method, in which an orifice of increasing conicity is machined with a tool in the form of a flat disc, is described in W. German Published Patent Application (DOS) No. 2,238,698.

The invention [concerns] *provides* another method of machining which enables simultaneous machining [of] the front and lateral surfaces of a recess to the same shape as the tool. Up to the present, the finishing machining of a recess by successive passes with a single tool could be carried out using the method described in French Pat. No. 1,274,953. This method consists in making the tool penetrate in the workpiece during a machining pass by a relative transverse translational displacement of constant amplitude, and then repeating this operation, in a following pass, after having increased the amplitude of this movement, thus usually causing at least a partial withdrawal of the tool from the workpiece. This method of machining produces a great local wear of the tool and necessitates a control of the frontal penetration of the tool in the workpiece in addition to control of the amplitude of the translational movement.

The invention provides a new method which enables: (a) avoidance of successive withdrawals of the tool from the workpiece, (b) elimination of local wear of the tool, and (c) control of the three-dimensional progression of machining, using a single device for measuring the amplitude of the translational movement.

This new method of machining is characterized in that one of the electrodes is made to penetrate into the other to a depth such that sparking is produced on the frontal and/or lateral parts of said surface, then the electrodes are moved relative to one another with oblique translational movements along at least one generatrix of a surface of revolution of increasing section in said direction of penetration, these oblique translational movements being obtained in a manner known per se by a rigid connection between rectilinear translational movements along said axis and translational movement in said plane and controlled, in a manner known per se, so as to maintain given sparking conditions in a machining zone comprised between the electrodes, this zone simultaneously extending on said frontal and lateral parts of said surface during at least a part of the finishing machining.

When, for example, said surface of revolution is in the form of a cone whose apex forms a right angle, control of the axial and radial advance of machining is obtained simply by a limitation of the amplitude of the translational movement to a predetermined value. This limiting value corresponds to a given point of one of the generatrices of this cone in the case of linear translation, or to a circle inscribed on the surface of this cone when there is a cyclic translation. In both cases, the rapidity and precision of machining are greater than those that would be obtained using the known machining methods.

SUMMARY OF THE INVENTION

The present invention has for one of its objects to form in a workpiece an EDM machined portion which has substantially the same geometry or shape as that of the tool electrode, by causing for all practical purposes a 3-dimensional dilation of the tool electrode, which is obtained by varying the eccentricity of the translation motion of the tool electrode continuously of an amount proportional to the relative axial displacement of the electrode.

One of the advantages obtained by the invention is to effectuate and simultaneously control the frontal and lateral machining in the course of roughing and finishing passes, and to provide an equal wear of the tool electrode on all its active surfaces.

The many objects and advantages of the present invention will become more apparent to those skilled in the art when the following description of the best modes contemplated for practicing the invention is read in conjunction with the accompanying drawing.

BRIEF DESCRIPTION OF THE DRAWINGS

The accompanying drawings show, schematically and by way of example, two embodiments of a device for carrying out the method according to the invention.

In the drawings:

FIG. 5 is a cross-section along line [V—V] *5—5* of FIG. 4; and

FIG. 6 is a cross-section along line [VI—VI] *6—6* of FIG. 5.

DETAILED DESCRIPTION OF THE PREFERRED EMBODIMENTS

Figure 1:
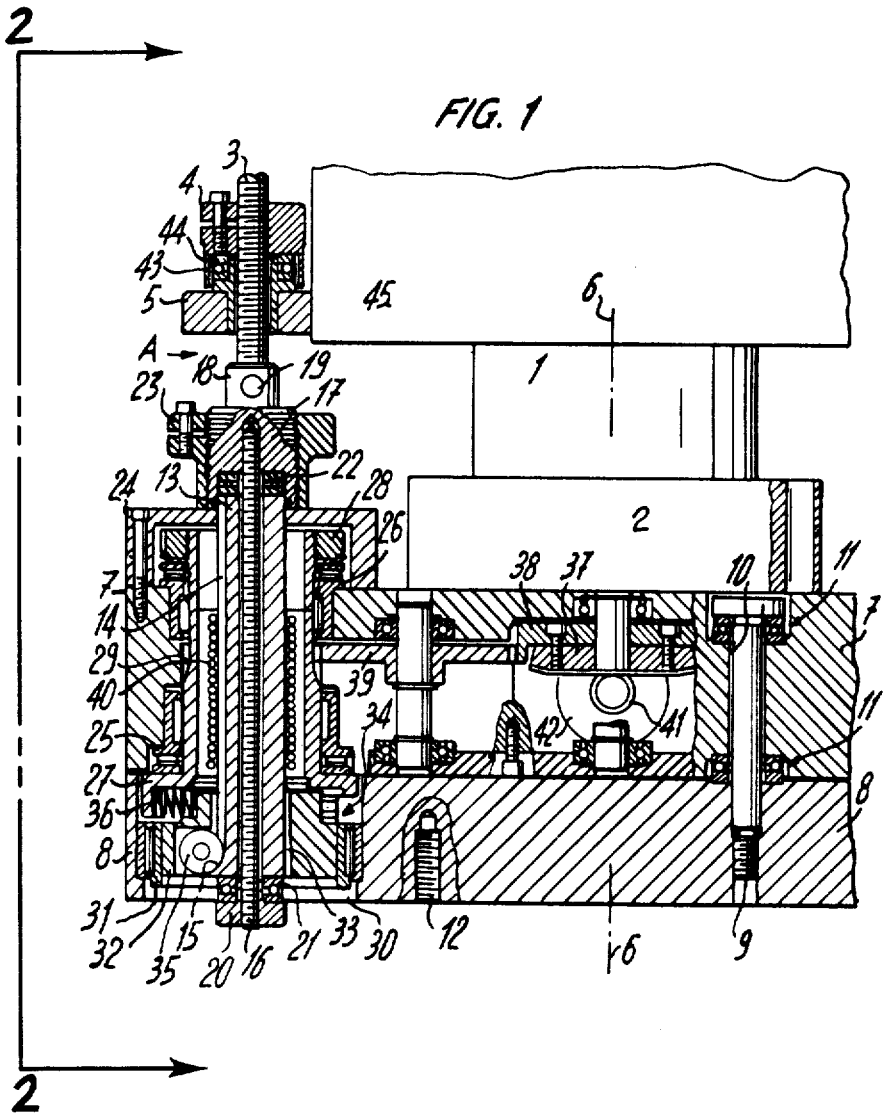
FIG. 1 is a partial view in longitudinal cross-section of a first embodiment.
Figure 2:
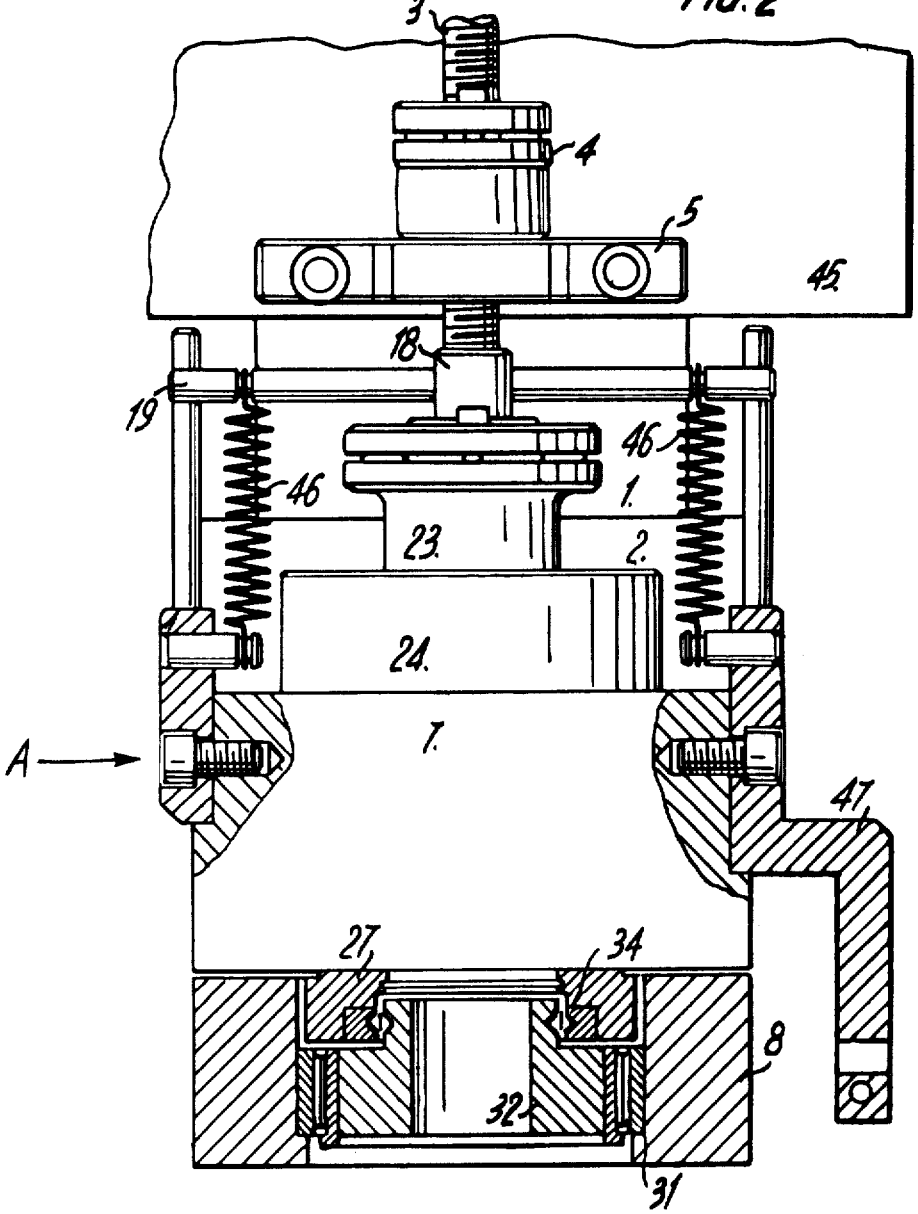
FIG. 2 is a view [along arrow A] *from line 2—2* of FIG. 1, partly cut away and in cross-section.

The device *A* of FIGS. 1 and 2 is carried mainly by a plate 2 fixed to a piston 1 of an electrical discharge machining machine. This device A is connected to a bracket 5 of the machine by [two] *a* threaded [rods] *rod β* engaging in *a* setting [nuts] 4. The device is generally symmetrical about a plane of symmetry 6, only its left hand part being shown in FIG. 1. A second rod, identical to rod 3, is thus disposed to the right of the machine and is not shown in the drawings.

During finishing machining, the piston 1 is moved axially. The plate 2 carries a block 7 enclosing a gear mechanism and provided with an electrode support 8. Piston 1, plate 2 and block 7 form a compact unit in relation to which the electrode support 8 can move in translation in its horizontal plane. This displacement of support 8 in relation to the block 7 is made possible by tie-bolts 9 which each pass through a bore of block 7 with a play 10. The support 8 is connected to block 7 by the tie-bolts 9 with interposed abutment bearings 11 allowing displacement of the support 8 in relation to block 7 within the limits of play 10. The support 8 has screw-threaded openings 12 for receiving bolts securing an electrode, not shown.

The parts of the device A which serve to produce translational displacements of the support 8 in relation to block 7 will now be described.

A hollow guide shaft 13 passes through the block 7 and electrode support 8. This shaft 13 has a longitudinal groove 14 having a terminal part forming a ramp 15. The shaft 13 turns freely about a rod 16 which passes through the shaft 13 and is threaded at least at each end. Rod 16 is fixed in a piece 17 connected to the threaded rod 3. Piece 17 has a portion 18 in which rod 3 is secured by a transverse pin 19. Thus, rod 3, portion 18, piece 17 and rod 16 form a rigid assembly in the longitudinal direction.

At the lower end of rod 16 is a nut 20 axially fixing the shaft 13 to said rigid assembly, while allowing it to turn freely on two axial ball-bearings 21 and 22.

The piece 17 has an external thread screwed in a setting nut 23 bearing on a cap 24 secured on block 7 by screws. Hence, all of the elements of the device, in as much as they are not supported by bracket 5, are carried by the plate 2.

The block 7 is provided with two combined axial and radial needle bearings 25 and 26 on which a sleeve 27 is [pivotally] *rotatably* mounted. Bearings 25 and 26 are [set] *held* by a nut 28. The shaft 13 is slidably mounted in sleeve 27 by means of a ball-slide 29, known per se. It is hence possible to control an axial movement of the shaft 13 in sleeve 27 either by nut 23 or by nut 4, as will be explained further on.

The electrode support 8 has a housing 30 in which is disposed a radial needle-bearing 31 on which an eccentric 32 is [pivotally] *rotatably* mounted. The eccentric 32 is annular and surrounds the shaft 13 with a play 33 which may be equal to play 10. The upper part of eccentric 32 and the lower part of sleeve 27 engage with one another by a radial slide 34 so that the eccentric 32 may move radially in relation to the sleeve 27 by the amount of play 33. This radial movement of the eccentric 32 is controlled by a roller 35 mounted on the eccentric for cooperation with ramp 15. A spring 36, acting between the sleeve 27 and eccentric 32, biases the eccentric 32 to tend to keep it centred in relation to shaft 13. The block 7 also houses transmission members including a bevel pinion 37 fixed on a toothed wheel 38 meshing with another toothed wheel 39 which in turn meshes with an external toothing 40 on sleeve 27. The bevel pinion 37 is rotatably driven by a bevel pinion 41 of an electric motor 42. As the roller 35 of eccentric 32 is engaged in the slot 14 of shaft 13, the latter is also rotatably driven by the eccentric 32. When the eccentric 32 is disposed centrally about the shaft 13, i.e. with zero eccentricity, no displacement of the electrode support 8 relative to block 7 is produced in response to rotation of the shaft 13 and eccentric 32.

The bracket 5 is provided with a sleeve 43 of insulating material through which the threaded rod 3 passes with play. This sleeve 43 carries the setting [screw] *nut* 4 by the intermediary of an axial ball bearing 44. The transverse pin 19 is urged by two traction springs 46, *FIG. 2*, so that shaft 13 correctly bears against the bracket 5 fixed on the frame 45 of the machine. The springs 46 are indirectly connected to block 7. As shown in FIG. 2, block 7 also carries a bracket 47 adapted to carry a [comparator] *dial indicator*, not shown.

It has already been stated above that the device is generally symmetrical about the plane 6. However, this symmetry does not apply to the elements, 1, 2, 7, 8, 41, 42, 37, 38 and 45. In accordance with this symmetry, the device comprises two eccentrics 32 with two slides 34 parallel to one another for a given position of the eccentrics disposed on the same line. When the *axis of the* eccentric 32 is [decentred in relation to] *no longer aligned with the axis of the* shaft 13, the entire electrode support 8 moves as an eccentric connecting rod.

In an example of carrying out the method according to the invention, the device of FIGS. 1 and 2 is used as follows:

Firstly, one proceeds to adjust the position of eccentrics 32 so that they have a zero eccentricity on their respective shaft 13 when the nut 23 bears against the upper face of cap 24. This adjustment is carried out by turning each nut 23 relative to piece 17 to axially displace the shaft 13 until the roller 35 lies on ramp 15 in a position giving zero eccentricity. To carry out this adjustment, a [comparator] *dial indicator* is placed on each bracket 47 with a sensor of the [comparator] *dial indicator* applied against the electrode support 8. The motor 42 is started, and the described adjustment is carried out until the [comparator] *dial indicator* indicates that the support 8 is not deviated while the motor continues to rotate the eccentrics.

Then the desired depth of machining is adjusted by acting on nut 4. If, during this adjustment, the electrode rests on the upper face of the workpiece, the depth of machining corresponds to the distance the nut must travel to abut against the axial bearing 44, plus the displacement during finishing machining and the spark distance during the finishing phase.

Rough machining is then carried out, by advancing the electrode in the conventional manner to make it penetrate in the workpiece. During this first phase of machining, the nut 23 rests on the cap 24 so that the electrode is not subjected to a translational movement since the device has a zero eccentricity. During this first phase, the piston 1 controls the advance of the electrode. As this advance progresses, the nut 4 moves towards its position of abutment against the bracket 5 and, when this position is reached, the machining passes from the rough phase to the finishing phase.

As soon as the nut 4 abuts against the bearing 44, any further displacement of the piston 1 towards the workpiece produces a displacement of shaft 13 relative to the main part of the device and hence produces an increasing eccentricity of shaft 13. This eccentricity is very small and in general remains well below one millimeter. Consequently, the cavity machined in the workpiece has the same shape as the electrode.

The rigid linkage which determines the degree of eccentricity of the translational movement as a function of the advance of the electrode from the moment when the nut 4 has reached its axial abutment position produces a virtual dilatation of the electrode in a plane perpendicular to the axial direction along which it advances. This arrangement is very advantageous since as soon as the machining conditions tend to deteriorate and it is consequently necessary to slightly withdraw the electrode, this withdrawal is accompanied by a reduction of the amplitude of translation and hence of the virtual dilatation of the electrode. Hence, the servo-control device, which operates solely in the axial direction, simultaneously controls a radial withdrawal of the envelope generated by the translational movement of the electrode. Thus, the servo-control device can operate to adjust the position of the electrode as a function of the instantaneous machining conditions while taking into account the conditions of both the frontal machining distance and the lateral machining distance.

The embodiment of FIGS. 3 to 6 involves an improvement in that the device is of simpler construction without a reduction of the quality of machining.

In this embodiment, the device is not symmetrical about plane 6. The machine has a frame 45 and a piston 1 carrying plate 2. There is only a single control device, visible in the left hand part of FIG. 3. The block 7' is fixed to the plate 2 and a casing 55 is rigidly fixed, with an interposed insulating plate 56, to the plate 2. Electrode support 8' is connected to block 7' by a table with a cross-sliding arrangement including slides 48 and 49. The support 8' is rigidly connected to a lower casing 58 with an interposed insulating plate 57. The casings 55 and 58 are connected together by tie-bolts 9 having bearings 11 allowing relative displacements of the casings in a horizontal plane, within the limits of play 10.

A device for producing a translational movement of support 8' with a variable radius comprises a vertical rod 59 having a square portion 60 as well as a threaded part 61 towards its lower end, as shown in FIG. 5. The lower end of rod 59 is mounted in two axial bearings 62 and 63 so as to be connected without axial play to a piece 64 while being able to freely turn in relation to piece 64.

The upper end of piece 64 has a toothing 65 by which it can be rotatably driven by a motor *42* and gears, not shown, analogous to those of the first embodiment. This piece 64 has a lower fork-shaped part having lateral branches 66 and 67 (FIG. 6). These branches 66, 67 have, on their inner faces, a part of two rectilinear guide devices 68.

The two guide devices 68 are inclined to the axis of rotation of piece 64 at an angle of 45° in the example shown.

The piece 64 is placed in a sleeve 69 carrying a cage of balls 70 forming a bearing with the casing 55 and allowing both rotation and axial displacement of the piece 64 in casing 55. The rod 59 protrudes from casing 55 by its threaded portion 61 which carries an abutment nut 71 which can be locked in position by a screw 72. For the purposes of assembly, the casing 55 is formed of two parts, a hollow rectangular part 73 and a cover 74.

An eccentric 75 of variable eccentricity is formed by a triangular plate 76 sliding between the branches 66 and 67 along guide devices 68. This plate 76 carries two downwardly-protruding coaxial studs 77 and 78 pivoting in casing 58 by the intermediary of a radial bearing 79 and two axial bearings 80.

To eliminate any axial play between the eccentric 75 and casing 58, a nut 83 is screwed on a threaded terminal portion of stud 78. This nut 83 is locked by a safety washer 82 and enables adjustment of the axial bearings 80 by the intermediary of a washer 81.

The eccentric 75 also has an axial bore in which is placed a [setting] *set* screw 84 forming a hooking point for an end of a spring 87 whose other end is hooked on a pin 85 of piece 64. This spring 87 biases the rod 59 and piece 64 downwards towards the eccentric 75.

The eccentric 75 is thus situated at the lower end of piece 64, and the guide devices 68 form a ramp between the piece 64 and eccentric 75. An axial displacement of piece 64 in relation to casing 55 produces a radial displacement of the eccentric 75 together with casing 58.

Figure 3:
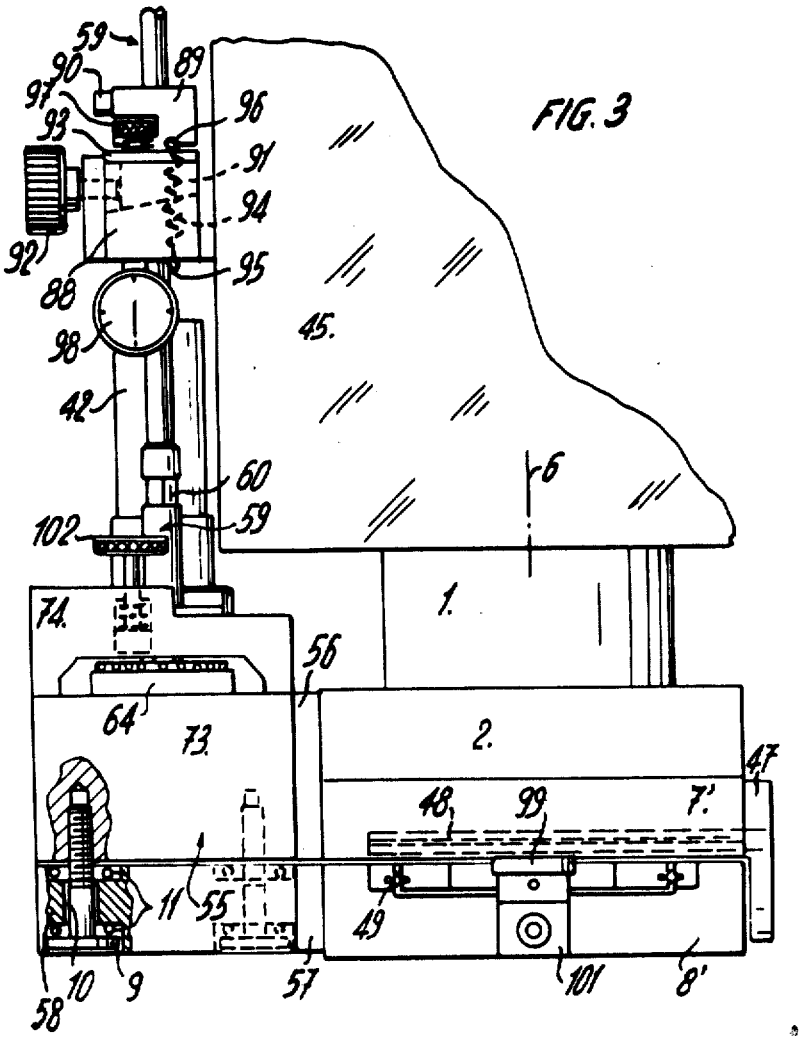
FIG. 3 is a partly cut-away side elevational view of a second embodiment[,]
Figure 4:
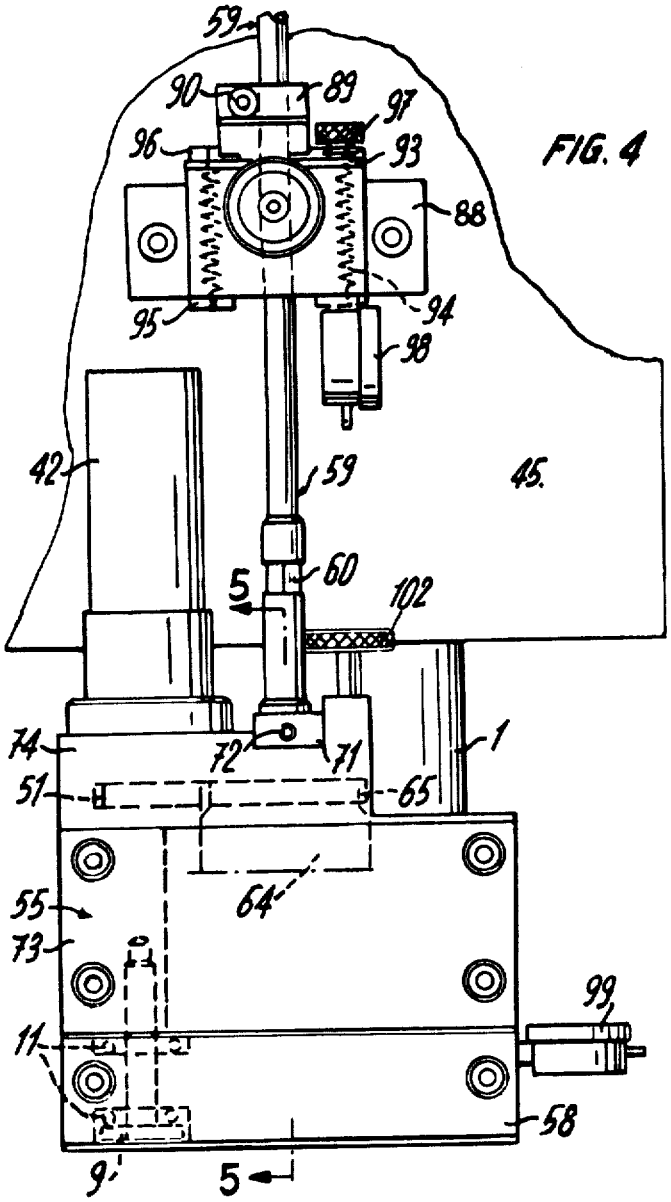
FIG. 4 is an end elevational view of the device of FIG. 3.

The upper part of rod 59 is smooth and engages in an opening of a casing 88, *FIGS. 3 and 4*, fixed to the frame 45 of the machine. This rod 59 carries an adjustable piece 89 whose position on rod 59 can be set by a screw 90. Piece 89 has the same role as the nut 4 of FIG. 1, i.e. it determines the depth of penetration of the electrode from which machining should be carried out with translation of the electrode.

The casing 88 also contains a wedge 91 able to be moved towards the right, FIG. 3, by means of a setting screw 92 against the action of a biasing spring, not shown. A plate 93 is placed on wedge 91 and is applied against it by two traction springs 94. These springs 94 are hooked at their lower ends on pins 95 held under the casing 88 and at their upper ends on pins 96 bearing on the plate 93 which forms an abutment for piece 89.

The position of plate 93, set by the screw 92 and wedge 91, can be detected by a [comparator] *dial indicator* 98 having a feeler in contact with the end of a screw 97 engaged in a threaded hole of plate 93. *Another dial indicator 99, supported by a bracket 101, is useful for checking the relative position of the cross-slides, but forms no part of the invention.*

Operation of the device of FIGS. 3 to 6 is very similar to that of the first embodiment.

The position of nut 71 can be set to provide a zero eccentricity of the eccentric 75 when the nut 71 bears on cover 74. Adjustment of the position of piece 89 on rod 59 sets the distance by which the electrode penetrates in the workpiece without translation.

During machining, the piston 1 is controlled to move the electrode and make it penetrate into the workpiece. This movement is purely axial as long as the piece 89 has not come to abut against the plate 93. However, from this moment, the rod 59 can no longer advance at the same time as the plate 2 so that a relative axial displacement is produced between the rod 59 and casing 55. The device of FIG. 5 then controls an eccentricity which increases linearly with the axial advance produced by piston 1. To obtain a translational movement with a substantially circular trajectory, it is of course necessary to rotatably drive the piece 64 by means of electric motor 42.

It is clear that in certain cases, a circular translational movement of the electrode may be undesirable. For example, when the cavity to be machined must have in its lateral wall an angle or a [dihedron having] *two surfaces intersecting at* a sharp angle [in cross-section], a circular translation must not be used; to the contrary, it is advantageous to machine with a radial translation along a given direction, preferably in a plane that bisects the sharp angle. This is obtained by stopping the motor 42 and angularly setting the guide devices 68 parallel to said plane.

It should be remarked that although the described guide devices 68 are inclined by 45°, good results may be obtained with other angles of inclination.

When translation is provided in a radial plane, i.e. when the motor 42 does not drive piece 64, orientation of the radial plane is facilitated by an arrangement, shown in FIG. 3, consisting of a stop rod 102 slidably mounted in the cover 74 and having an end that can be placed in any one of a series of notches in the upper face of piece 64. Hence, the piece 64 can be locked in a well determined angular position during the machining operation in question.

It is also clear that when carrying out the method it is not essential to provide a purely axial advance of the electrode during the initial phase of machining. To the contrary, it is possible when carrying out the preliminary adjustments to leave a certain eccentricity of the device, namely by the adjustment provided by means of nut 23 in the case of FIG. 1, or that provided by the nut 71 in the case of FIG. 5. Hence, at the beginning of the finishing phase of machining, translational movements will be provided about the generatrices of a cone starting from points eccentric in relation to the axis of the cone.

I claim:

1. In an electrical discharge machining arrangement for machining the surface of a recess in a workpiece electrode, in which relative movements of the electrodes are controlled to maintain given sparking conditions in a machining zone comprised between the electrodes, and comprising a device for controlling a translational displacement of one electrode relative to the other both in the direction of an axis of penetration of one of said electrodes into the other electrode and in a plane perpendicular to said axis, said device comprising a support for said one electrode, first means for moving the support in translation along said axis, and second means for moving the support in translation according to a predetermined amplitude in a plane perpendicular to said axis to provide a combined translational movement of the support along said axis and in said perpendicular plane, said second means comprising an eccentric member having, parallel to said axis of penetration, an axis in relation to which said support is fixed in position, the improvement comprising a rotatable shaft having an axis parallel to said axis of penetration, said eccentric member cooperating with said shaft for sliding in relation to said shaft in a direction forming an angle with said axis of penetration and for rotating with said shaft about the axis of said shaft, means for sliding said eccentric member relative to said shaft in response to movement of the support along said axis by said first means such that the amplitude of said translation of said support in said plane progressively varies as a function of the translational movement along said axis beyond a predetermined distance, [wherein] *slidable linear guide means between* said eccentric member and said shaft [have facing faces], *said* linear guide means [are disposed between said facing faces] allowing sliding of said [facing faces] *eccentric member* relative to [one another] *said shaft* along said direction, and means [are provided] for holding said eccentric member and shaft together while allowing relative radial and axial displacements therebetween.

2. The improvement of claim 1 comprising means for rotating said shaft and said eccentric member at a given speed.

3. The improvement of claim 1, in which said eccentric member slides relative to said shaft along a direction at 45° to said axis of penetration.

4. The improvement of claim 1, comprising means for limiting the axial displacement of said shaft relative to a frame of the device to actuate sliding of said eccentric [piece] *member* in response to movement of said support beyond a predetermined position of penetration of its electrode.

5. The improvement of claim 4, in which said means for sliding said eccentric member modifies its eccentricity as a function of the axial displacement of the support beyond said predetermined position.

6. The improvement of claim 4, comprising means for setting the axial position of the shaft relative to said support to set the eccentricity of said eccentric member at a predetermined value while said support has not reached said predetermined position.

7. The improvement of claim 6, in which said shaft is mounted coaxially with a rod relative to which it is fixed axially but free to rotate, said limiting means and said setting means cooperating with said rod.

8. The improvement of claim 4, in which said shaft is mounted coaxially with a rod relative to which it is fixed axially but free to rotate, said limiting means cooperating with said rod.

9. The improvement of claim 1, in which said shaft has a forked end part in which a part of the eccentric member is disposed.

10. The improvement of claim 1, in which said shaft is disposed within a casing on which said support is fixed axially but movable in translation perpendicular to the axis of the shaft, said shaft being mounted for axial movement and rotation in said casing by an annular ball slide disposed around said linear guide means of the shaft and the eccentric member.

11. The improvement of claim 1, in which said eccentric member is a sleeve surrounding the shaft with play.

* * * * *